United States Patent
Tsuruya

(10) Patent No.: US 7,298,631 B2
(45) Date of Patent: Nov. 20, 2007

(54) SWITCHING POWER SOURCE APPARATUS

(75) Inventor: Mamoru Tsuruya, Niiza (JP)

(73) Assignee: Sanken Electric Co., Ltd. (JP)

( * ) Notice: Subject to any disclaimer, the term of this patent is extended or adjusted under 35 U.S.C. 154(b) by 217 days.

(21) Appl. No.: 10/550,000

(22) PCT Filed: Oct. 22, 2004

(86) PCT No.: PCT/JP2004/015713

§ 371 (c)(1), (2), (4) Date: Sep. 20, 2005

(87) PCT Pub. No.: WO2005/053140

PCT Pub. Date: Jun. 9, 2005

(65) Prior Publication Data

US 2006/0203521 A1    Sep. 14, 2006

(30) Foreign Application Priority Data

Nov. 26, 2003  (JP) .............................. 2003-395497

(51) Int. Cl.
*H02M 3/335*   (2006.01)
(52) U.S. Cl. .............................. 363/21.01; 363/56.12; 363/95
(58) Field of Classification Search .................. 363/16, 363/20, 21.01, 56.01, 56.12, 95, 97, 131
See application file for complete search history.

(56) References Cited

U.S. PATENT DOCUMENTS 6,396,719 B2 * 5/2002 Morita et al. ............ 363/21.12

(Continued)

FOREIGN PATENT DOCUMENTS

| JP | 09-312973 | 12/1997 |
| JP | 11-289763 | 10/1999 |
| JP | 2000-184710 | 6/2000 |

OTHER PUBLICATIONS

Kousuke Harada "Switching Power Source Handbook," Nikkan Kogyo Shinbunsha Shuppan, Chapter 2 Basic Circuit and Designing Practice of Switching Power Source, p. 27, Fig 2.2.
Kazuo Shimizu "High-Speed Switching Regulator," Sougou Densi Suppansha, 2.2.1 Separately Excited Converter, p. 30, Fig. 2.5.

*Primary Examiner*—Adolf Berhane
(74) *Attorney, Agent, or Firm*—Kilpatrick Stockton LLP

(57) ABSTRACT

A switching power source apparatus can reduce the size of a transformer and realize the zero-voltage switching of a switch. The apparatus is compact, highly efficient, and low in noise. The apparatus has a series circuit connected to each end of a DC power source (Vdc1) and including a primary winding (5a) of a transformer (T) and a main switch (Q1), a rectifying-smoothing circuit to rectify and smooth a voltage that is output from a secondary winding (5b) when the main switch (Q1) is turned on, a series circuit connected to each end of the primary winding (5a) and including an auxiliary switch (Q2) and a clamp capacitor (C1), a series circuit connected to each end of the primary winding (5a) and including an auxiliary reactor (Lx), a diode (Dx1), and a snubber capacitor (Cx), a series circuit connected to each end of the auxiliary switch (Q2) and including a diode (Dx2) and the snubber capacitor (Cx), and a control circuit (10) to alternately turn on/off the main switch (Q1) and auxiliary switch (Q2). When the main switch (Q1) is turned on, the snubber capacitor (Cx) is charged. When the main switch (Q1) is turned off, the snubber capacitor (Cx) is discharged to the clamp capacitor (C1) to relax the inclination of a voltage increase of the main switch (Q1).

10 Claims, 14 Drawing Sheets

U.S. PATENT DOCUMENTS

| | | |
|---|---|---|
| 6,639,813 B2 * | 10/2003 | Yamagishi et al. ...... 363/21.12 |
| 6,717,827 B2 * | 4/2004 | Ota .......................... 363/21.12 |
| 6,917,527 B2 * | 7/2005 | Takada ........................ 363/16 |
| 7,130,204 B2 * | 10/2006 | Tsuruya ................... 363/56.12 |
| 2002/0012257 A1 * | 1/2002 | Takahama et al. ............ 363/95 |
| 2003/0198064 A1 * | 10/2003 | Zhu et al. ................ 363/21.01 |
| 2006/0146584 A1 * | 7/2006 | Aso et al. ..................... 363/95 |
| 2006/0176715 A1 * | 8/2006 | Hosotani et al. ......... 363/21.01 |

* cited by examiner

SWITCHING POWER SOURCE APPARATUS

TECHNICAL FIELD

The present invention relates to a switching power source apparatus that is highly efficient, compact, and low noise.

BACKGROUND TECHNOLOGY

FIG. 1 is a circuit diagram showing a switching power source apparatus according to a related art (Non-Patent Document 1 and Non-Patent Document 2). In the switching power source apparatus of FIG. 1, a DC power source Vdc1 is connected through a primary winding 5a (the number of turns of n1) of a transformer T to a main switch Q1 that is made of, for example, a MOSFET (hereinafter referred to as FET). Each end of the primary winding 5a is connected to a parallel circuit composed of a resistor R2 and a capacitor C2 and a diode D3 that is connected in series with the parallel circuit. The main switch Q1 is turned on/off by PWM control of a control circuit 100.

The primary winding 5a and a secondary winding 5b of the transformer T are wound to generate in-phase voltages. The secondary winding 5b (the number of turns of n2) is connected to a rectifying-smoothing circuit composed of diodes D1 and D2, a reactor L1, and a capacitor C4. The rectifying-smoothing circuit rectifies and smoothes a voltage (ON/OFF-controlled pulse voltage) induced by the secondary winding 5b of the transformer T and outputs a DC voltage to a load RL.

The control circuit 100 has an operational amplifier and a photocoupler (not shown). The operational amplifier compares an output voltage of the load RL with a reference voltage, and if the output voltage of the load RL is equal to or larger than the reference voltage, narrows the ON width of a pulse to be applied to the main switch Q1. Namely, narrowing the ON width of a pulse to the main switch Q1 when the output voltage of the load RL becomes equal to or larger than the reference voltage controls the output voltage to a constant voltage.

Next, operation of the switching power source apparatus having the above-mentioned configuration will be explained with reference to a timing chart shown in FIG. 2. In FIG. 2, there are shown a terminal voltage Q1v of the main switch Q1, a current Q1i passing to the main switch Q1, and a Q1-control signal to conduct ON/OFF control of the main switch Q1.

At time t31, the main switch Q1 turns on in response to the Q1-control signal, and the DC power source Vdc1 passes the current Q1i through the primary winding 5a of the transformer T to the main switch Q1. This current linearly increases as time passes up to time t32. Like the current Q1i, a current n1i passing through the primary winding 5a linearly increases as time passes up to time t32.

Between time t31 and time t32, the main switch Q1 side of the primary winding 5a is a negative (−) side and the primary winding 5a and secondary winding 5b are in-phase. Accordingly, the anode side of the diode D1 becomes a positive (+) side to pass a current in order of 5b, D1, L1, C4, and 5b.

Next, at time t32, the main switch Q1 changes from ON state to OFF state according to the Q1-control signal. At this time, excitation energy of the primary winding 5a of the transformer T and energy of a leakage inductance Lg (an inductance not coupled with the secondary winding 5b) are not transferred to the secondary winding 5b, and therefore, are accumulated through the diode D3 in the capacitor C2.

Between time t32 and time t33, the main switch Q1 is OFF, and therefore, the current Q1i and the current n1i passing through the primary winding 5a become zero. Between time t32 and time t33, a current passes in order of L1, C4, D2, and L1, to supply power to the load RL.

According to this switching power source apparatus, insertion of the snubber circuit (C2, R2) relaxes a temporal change of the voltage of the main switch Q1 to reduce switching noise and suppresses a surge voltage applied from the leakage inductance Lg of the transformer T to the main switch Q1.

Non-Patent Document 1: Kousuke Harada "Switching Power Source Handbook," Nikkan Kogyo Shinbunsha Shuppan, Chapter 2 Basic Circuit and Designing Practice of Switching Power Source, p. 27, FIG. 2.2

Non-Patent Document 2: Kazuo Shimizu "High-Speed Switching Regulator," Sougou Denshi Shuppansha, 2.2.1 Separately Excited Converter, p. 30, FIG. 2.5

DISCLOSURE OF INVENTION

According to the switching power source apparatus shown in FIG. 1, charge being accumulated in the capacitor C2 is consumed by the resistor R2, to increase a loss. This loss is proportional to a conversion frequency. If the conversion frequency is increased to reduce the size of the apparatus, the loss increases to deteriorate efficiency.

As shown in FIG. 4, a transformer exciting current passed to the primary winding 5a of the transformer T linearly increases at positive values when the main switch Q1 is ON, and when the main switch Q1 is OFF, linearly decreases to zero. Namely, magnetic flux of the transformer T only uses the first quadrant of a B-H curve shown in FIG. 3. This results in decreasing the rate of use of a core of the transformer T and increasing the size of the transformer T.

The present invention provides a switching power source apparatus that is small, highly efficient, and low noise, allows the size of a transformer to be reduced, and realizes zero-voltage switching.

In order to achieve the object, the present invention of claim 1 is a switching power source apparatus comprising a first series circuit connected to each end of a DC power source and including a primary winding of a transformer and a main switch those are connected in series, a rectifying-smoothing circuit to rectify and smooth a voltage that is output from a secondary winding of the transformer when the main switch is turned on, a second series circuit connected to each end of the main switch or to each end of the primary winding of the transformer and including an auxiliary switch and a clamp capacitor those are connected in series, a third series circuit connected to each end of the primary winding of the transformer and including an auxiliary reactor, a first diode, and a snubber capacitor those are connected in series, a fourth series circuit connected to each end of the auxiliary switch and including a second diode and the snubber capacitor those are connected in series, and a control circuit to alternately turn on/off the main switch and auxiliary switch. When the main switch is turned on, the snubber capacitor is charged. When the main switch is turned off, the snubber capacitor is discharged to the clamp capacitor to relax the inclination of a voltage increase of the main switch.

According to the present invention of claim 2, the control circuit turns on the auxiliary switch to saturate a core of the transformer and increase an exciting current, and then, turns off the auxiliary switch to make the main switch conduct zero-voltage switching.

According to the present invention of claim 3, the rectifying-smoothing circuit has a fifth series circuit including the secondary winding and a tertiary winding of the transformer, a sixth series circuit connected to each end of the fifth series circuit and including a first rectifying diode and a smoothing capacitor, and a second rectifying diode connected to a node between the secondary winding and the tertiary winding and a node between the first rectifying diode and the smoothing capacitor.

According to the present invention of claim 4, the primary and secondary windings of the transformer are wound around the core of the transformer so as to provide a leakage inductance, and the primary and tertiary windings of the transformer are wound so as to provide a leakage inductance that is smaller than the leakage inductance provided by the primary and secondary windings.

According to the present invention of claim 5, a magnetic path of the core of the transformer has a portion with reduced cross-sectional area.

The present invention of claim 6 is a switching power source apparatus comprising a first series circuit connected to each end of a DC power source and including a primary winding of a transformer and a main switch those are connected in series, a rectifying-smoothing circuit to rectify and smooth a voltage that is output from a secondary winding of the transformer when the main switch is turned off, a second series circuit connected to each end of the main switch or to each end of the primary winding of the transformer and including an auxiliary switch and a clamp capacitor those are connected in series, a third series circuit connected to each end of the primary winding of the transformer and including an auxiliary reactor, a first diode, and a snubber capacitor those are connected in series, a fourth series circuit connected to each end of the auxiliary switch and including a second diode and the snubber capacitor those are connected in series, and a control circuit to alternately turn on/off the main switch and auxiliary switch. When the main switch is turned on, the snubber capacitor is charged. When the auxiliary switch is turned on, the clamp capacitor is discharged through the secondary winding to the rectifying-smoothing circuit. When the main switch is turned off, the snubber capacitor is discharged to the clamp capacitor to relax the inclination of a voltage increase of the main switch.

According to the present invention of claim 7, the rectifying-smoothing circuit has a series circuit connected to each end of the secondary winding of the transformer and including a rectifying diode and a smoothing capacitor.

As explained above, the present invention provides a low-noise, high-efficiency switching power source apparatus capable of achieving zero-voltage switching and making the rise and fall of a voltage gentler due to a resonance action.

The present invention can improve the rate of use of magnetic flux of the core of a transformer, to thereby reduce the size of the transformer. By adjusting the capacitance of the snubber capacitor, the present invention can relax the inclination of a voltage increase when the main switch is turned off and can adjust the rate of use of magnetic flux of the core of the transformer. The energy of the snubber capacitor is discharged to the output side. This results in reducing the noise and size of the switching power source apparatus and improves the efficiency thereof.

BRIEF DESCRIPTION OF DRAWINGS

FIG. 7 is a timing chart showing the details of the signals at the several parts of the switching power source apparatus of the first embodiment when a switch Q1 is turned on.

FIG. 17 is a timing chart showing the details of the signals at the several parts of the switching power source apparatus of the third embodiment when a switch Q1 is turned on.

BEST MODE OF IMPLEMENTATION

Switching power source apparatuses according to embodiments of the present invention will be explained in detail with reference to the drawings.

FIRST EMBODIMENT

A switching power source apparatus according to the first embodiment employs an auxiliary reactor so that a snubber capacitor connected through a diode to the auxiliary reactor is charged when a main switch is turned on. When the main switch is turned off, the snubber capacitor discharges to a clamp capacitor to make the inclination of a voltage increase gentler at the time when the main switch is turned off. At the same time, an auxiliary switch connected in series with the clamp capacitor is turned on, to bias the magnetic flux of a transformer toward a minus side to expand the range of change of magnetic flux. When an exciting current increases, the auxiliary switch is turned off to make the main switch conduct zero-voltage switching (ZVS). In this way, this embodiment establishes ZVS, improves efficiency, decreases noise, and reduces the size of the transformer.

Figure 1:
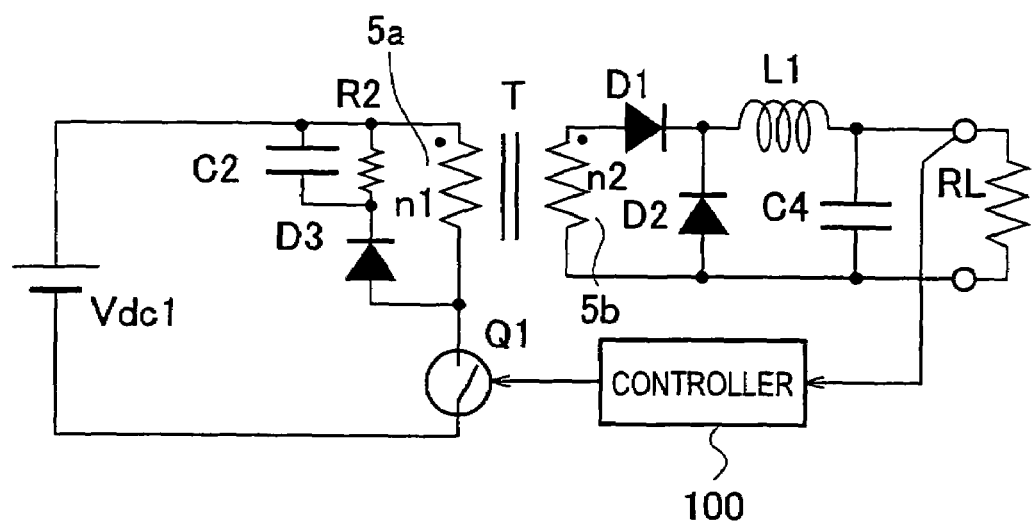
FIG. 1 is a circuit diagram showing a switching power source apparatus according to a related art.
Figure 2:
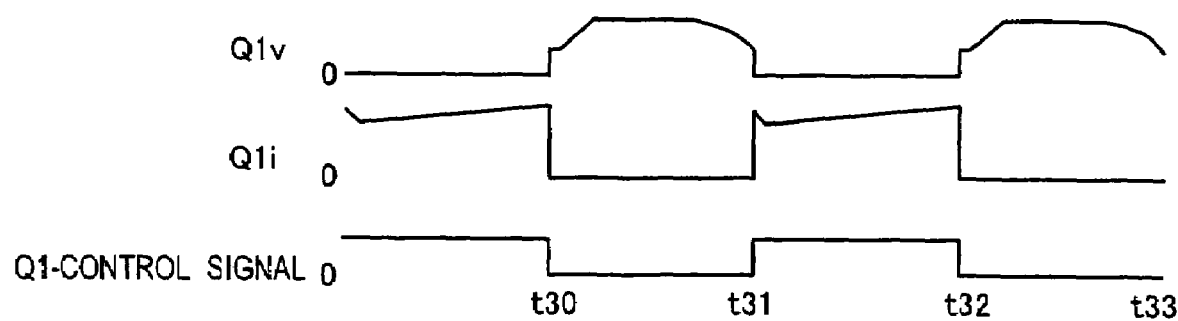
FIG. 2 is a timing chart showing signals at several parts of the switching power source apparatus of the related art.
Figure 3:
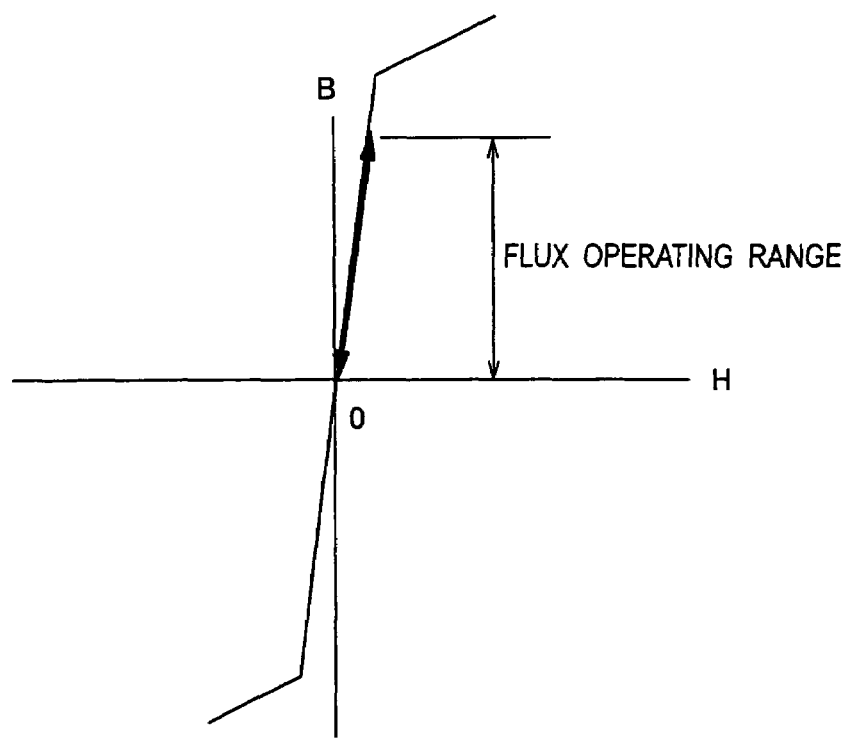
FIG. 3 is a view showing the B-H characteristics of a transformer arranged in the switching power source apparatus of the related art.
Figure 4:
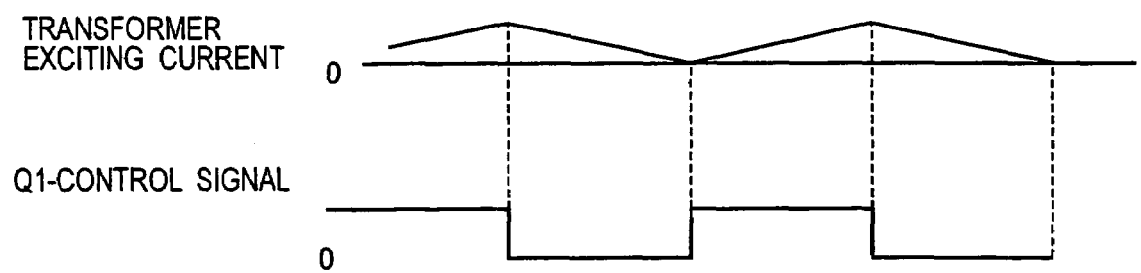
FIG. 4 is a timing chart showing an exciting current of the transformer arranged in the switching power source apparatus of the related art.
Figure 5:
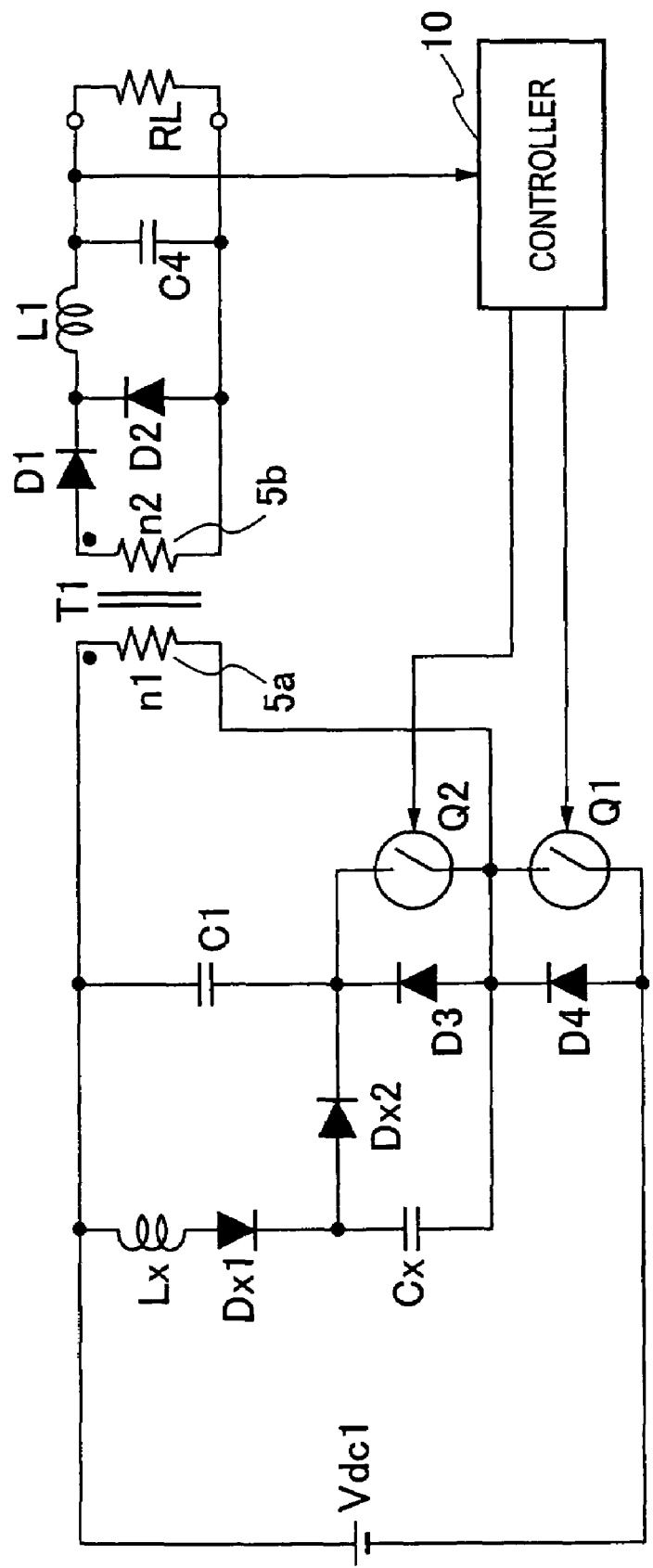
FIG. 5 is a circuit diagram showing a switching power source apparatus according to an first embodiment.

FIG. 5 is a circuit diagram showing the switching power source apparatus according to the first embodiment. In the switching power source apparatus of FIG. 5, each end of a DC power source Vdc1 is connected to a series circuit consisting of a primary winding 5a (the number of turns of n1) of a transformer T1 and a switch Q1 (main switch) made of a FET. Each end of the switch Q1 is connected to a diode D4 in parallel.

A node between a first end of the primary winding 5a of the transformer T1 and a first end of the switch Q1 is connected to a first end of a switch Q2 (auxiliary switch). A second end of the switch Q2 is connected through a clamp capacitor C1 to a positive electrode of the DC power source Vdc1. The second end of the switch Q2 may be connected through the clamp capacitor C1 to a negative electrode of the DC power source Vdc1.

Each end of the switch Q2 is connected to a diode D3 in parallel. The diode D4 may be a parasitic diode of the switch Q1, and the diode D3 may be a parasitic diode of the switch Q2. Each end of the switch Q2 is connected to a series circuit consisting of a diode Dx2 and a snubber capacitor Cx. Each end of the primary winding 5a of the transformer T1 is connected to a series circuit consisting of an auxiliary reactor Lx, a diode Dx1, and the snubber capacitor Cx.

A node between the capacitor Cx and the diode Dx1 and a node between the clamp capacitor C1 and the switch Q2 are connected to the diode Dx2. By adjusting the capacitance of the capacitor Cx, the inclination of a voltage increase of the switch Q1 is relaxed when the switch Q1 is turned off.

The switches Q1 and Q2 have a period (dead time) in which both of them are OFF. These switches are alternately turned on/off under PWM control of a control circuit 10.

The primary winding 5a and a secondary winding 5b (the number of turns of n2) that is in-phase with the primary winding 5a are wound around a core of the transformer T1. A first end of the secondary winding 5b is connected to an anode of a diode D1. A cathode of the diode D1 and a second end of the secondary winding 5b are connected to a diode D2. Each end of the diode D2 is connected to a series circuit consisting of a reactor L1 and a capacitor C4. The diode D1, diode D2, capacitor C4, and reactor L1 form a rectifying-smoothing circuit. The capacitor C4 provides a DC output to a load RL.

The control circuit 10 alternately turns on/off the switches Q1 and Q2. If an output voltage of the load RL exceeds a reference voltage, the control circuit 10 narrows the ON-width of a pulse applied to the switch Q1 and widens the ON-width of a pulse applied to the switch Q2. Namely, if an output voltage of the load RL exceeds the reference voltage, the ON-width of a pulse to the switch Q1 is narrowed to control the output voltage to a constant voltage.

The primary winding 5a of the transformer T1 usually passes an AC current of equal magnitude. Accordingly, magnetic flux equally increases and decreases in the first and third quadrants around a zero point on a B-H curve. However, a circuit loss is involved so that magnetic flux shows incomplete symmetry and is mainly active in the first quadrant.

Figure 11:
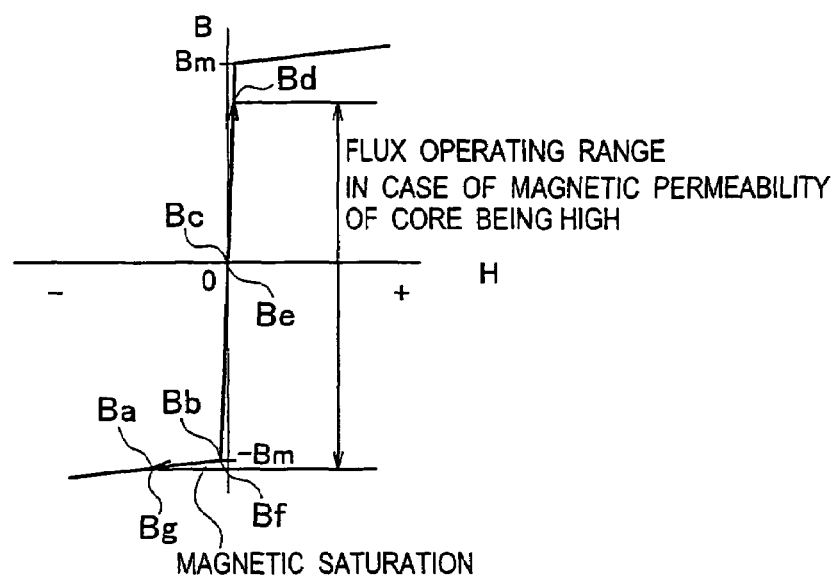
FIG. 11 is a view showing the B-H characteristics of a transformer with a high magnetic permeability (μ) of core in the switching power source apparatus of the first embodiment.

As a result, by increasing the magnetic permeability p of the core, the transformer T1 of the first embodiment produces magnetic flux B (more precisely, B is flux density and magnetic flux is $\phi = B \cdot S$ where S is the cross sectional area of the core, this embodiment assuming S=1 and $\phi = B$) that saturates at Bm with respect to a given positive magnetic field H as shown in FIG. 11. The magnetic flux also saturates at −Bm with respect to a given negative magnetic field H. A magnetic field H occurs in proportion to the magnitude of a current i. In the transformer T1, magnetic flux B moves along the B-H curve in order of Ba, Bb, Bc, Bd, Be, Bf, and Bg. The moving range of magnetic flux is wide. An interval between Ba and Bb and an interval between Bg and Bf each correspond to a saturated state.

Figure 10:
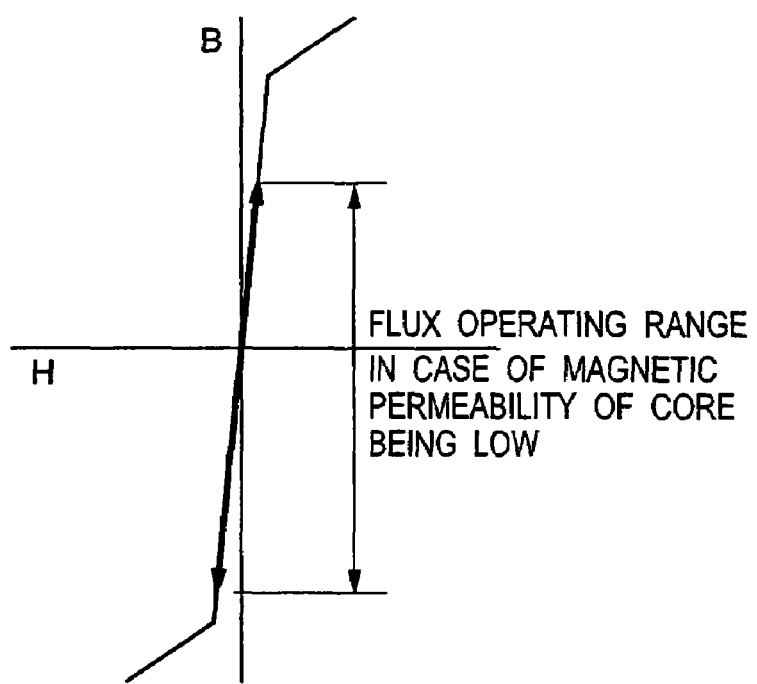
FIG. 10 is a view showing the B-H characteristics of a transformer with a low magnetic permeability (μ) of core in the switching power source apparatus of the first embodiment.

FIG. 10 shows a B-H curve with the magnetic permeability μ of the core being low. When the magnetic permeability μ of the core is low, the core does not saturate.

Figure 6:
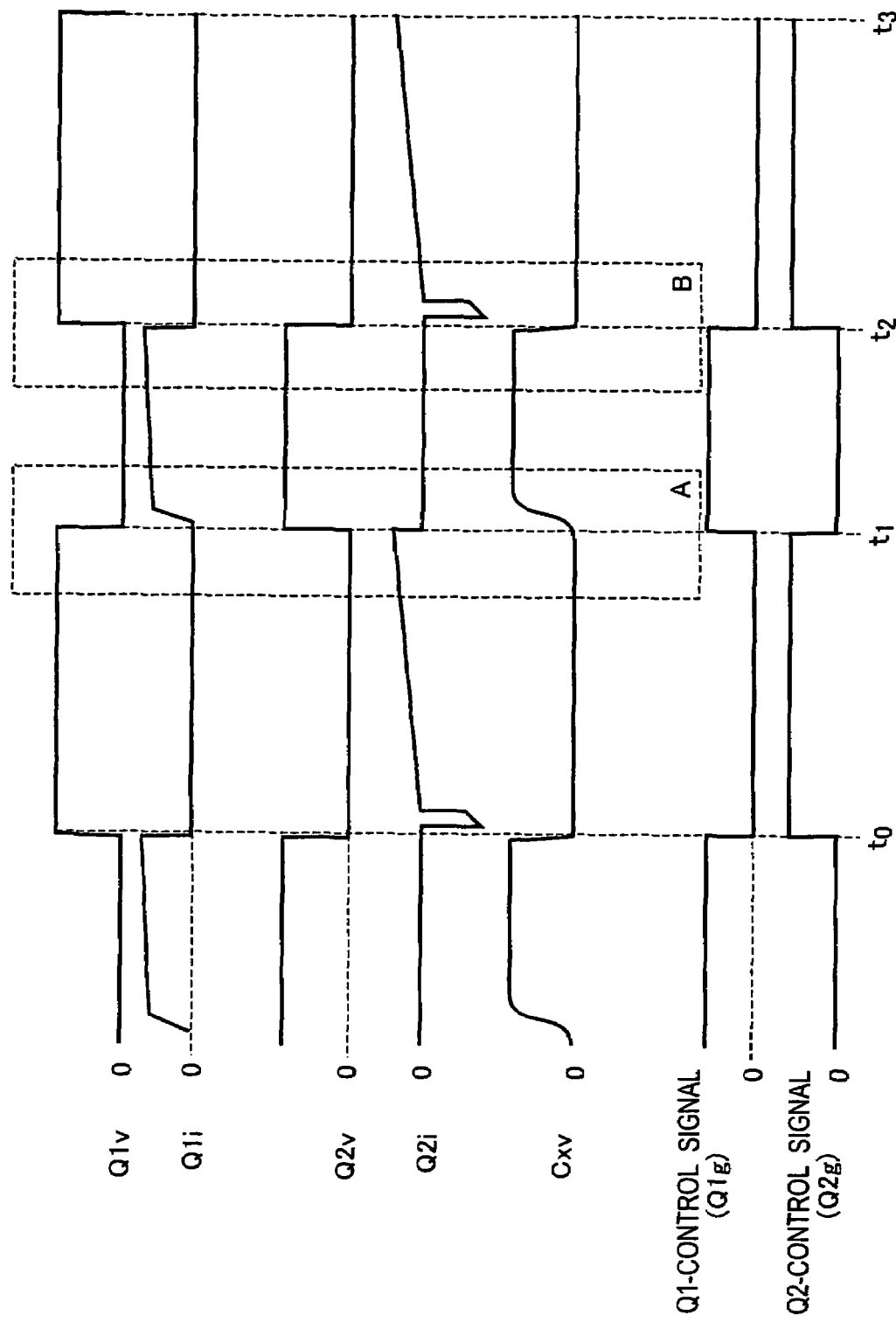
FIG. 6 is a timing chart showing signals at several parts of the switching power source apparatus of the first embodiment.
Figure 7:
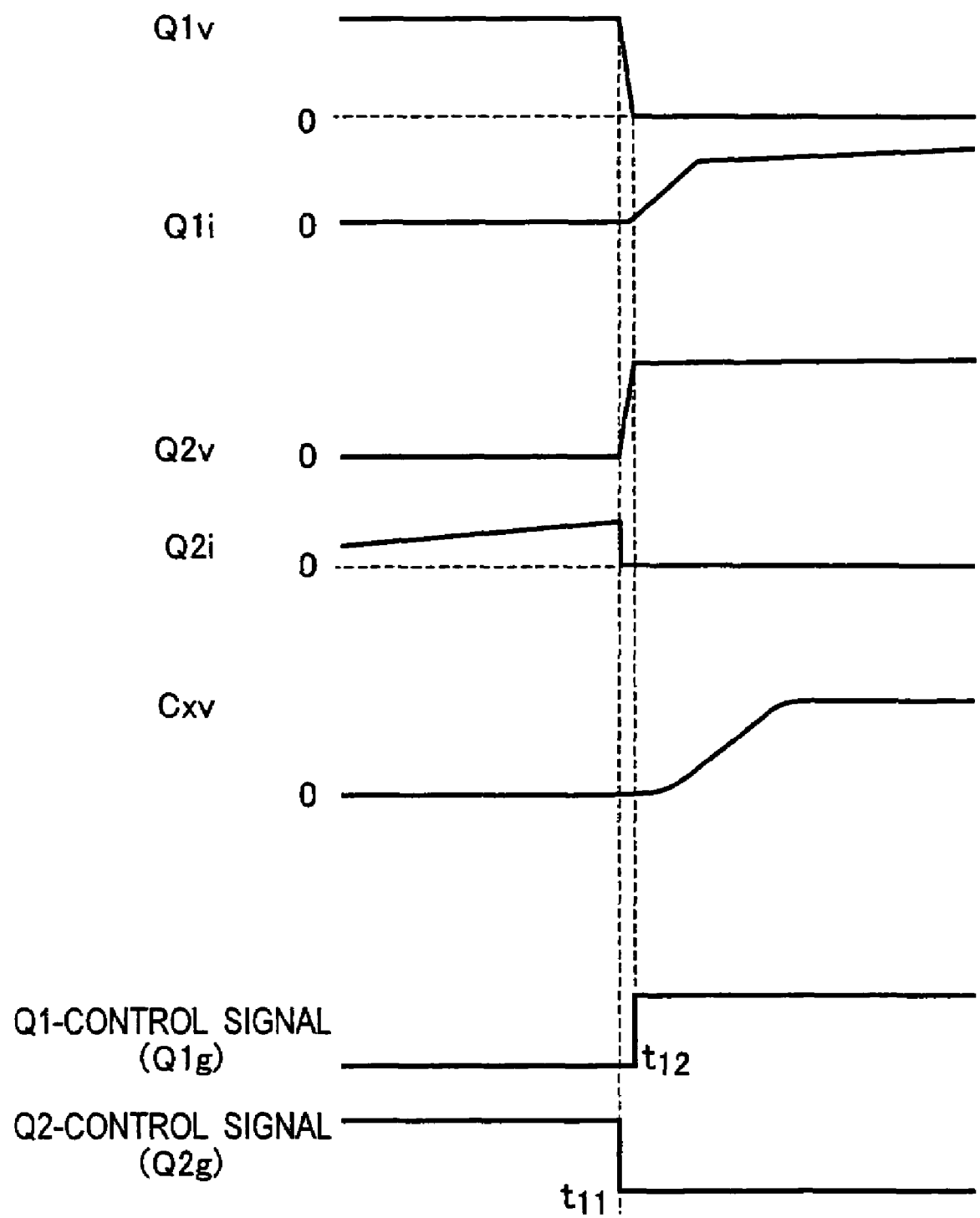
Figure 8:
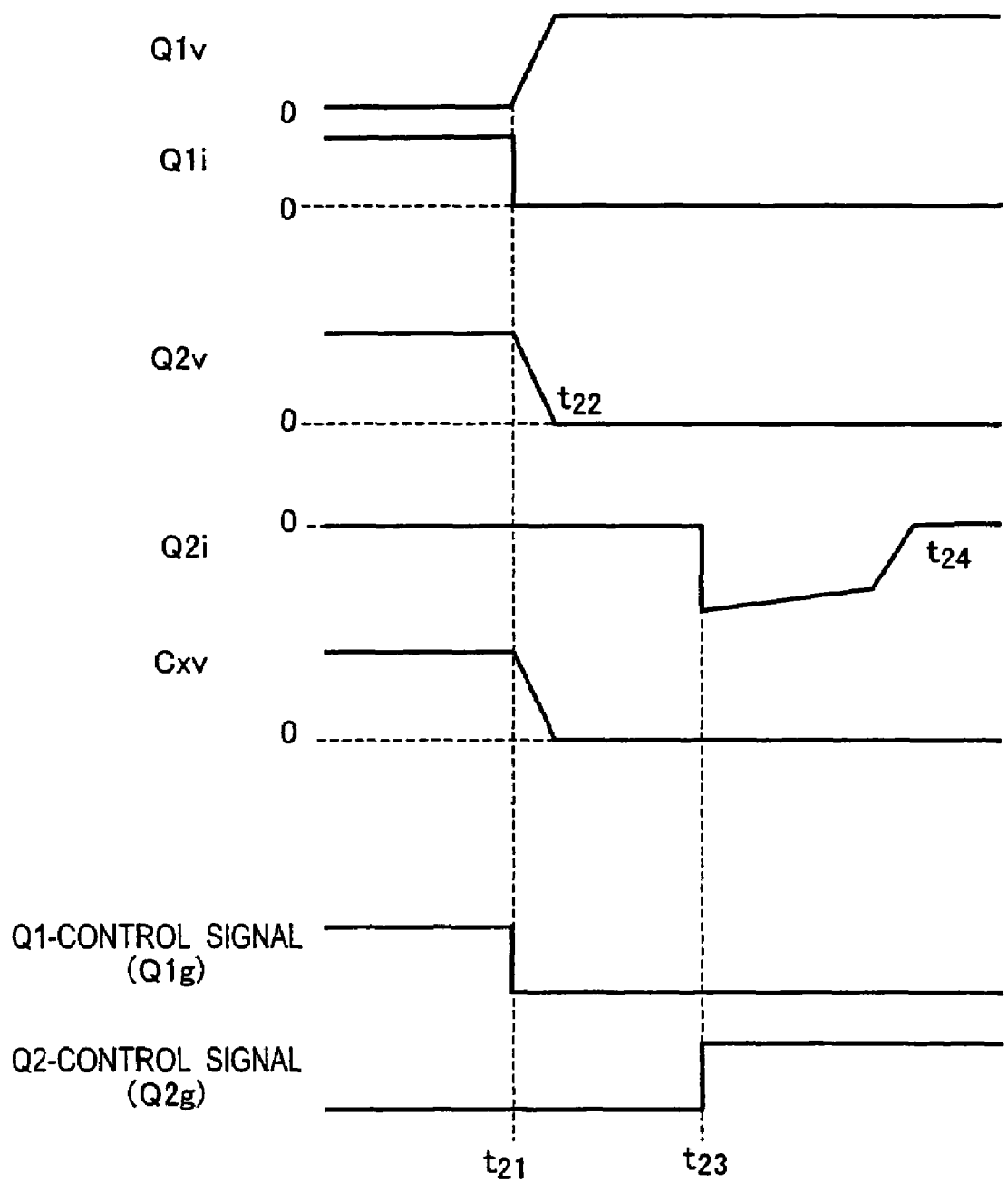
FIG. 8 is a timing chart showing the details of the signals at the several parts of the switching power source apparatus of the first embodiment when the switch Q1 is turned off.

Operation of the switching power source apparatus according to the first embodiment with the above-mentioned configuration will be explained with reference to timing charts of FIGS. 6 to 9 and 12. FIG. 6 is a timing chart showing signals at several parts of the switching power source apparatus of the first embodiment. FIG. 7 is a timing chart showing the details of the signals at the several parts of the switching power source apparatus of the first embodiment when the switch Q1 is turned on. FIG. 8 is a timing chart showing the details of the signals at the several parts of the switching power source apparatus of the first embodiment when the switch Q1 is turned off.

In FIGS. 6 to 8, there are shown a terminal voltage Q1v of the switch Q1, a current Q1i passing to the switch Q1, a terminal voltage Q2v of the switch Q2, a current Q2i passing to the switch Q2, and a terminal voltage Cxv of the capacitor Cx.

At time t1 (corresponding to time t11 to t12), the switch Q1 is turned on and a current passes in order of Vdc1, 5a, Q1, and Vdc1. At this time, the secondary winding 5b of the transformer T1 generates a voltage to pass a current in order of 5b, D1, L1, C4, and 5b. When the switch Q1 is turned off, a current passes in order of L1, C4, D2, and L1 to supply power to the load RL.

Figure 12:
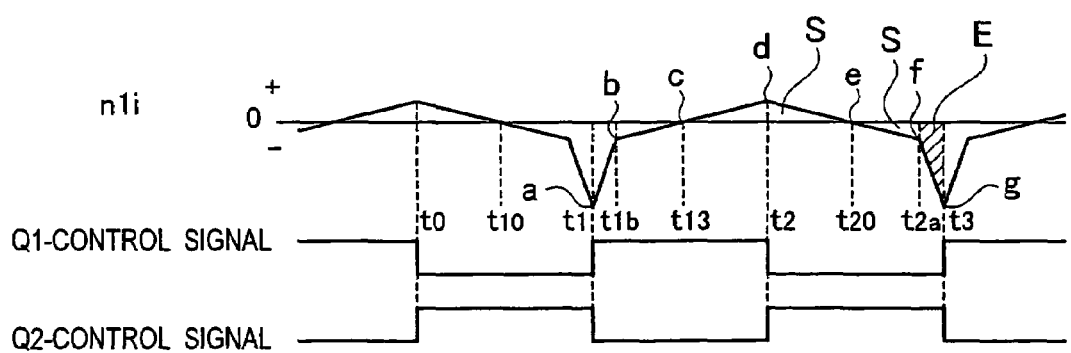
FIG. 12 is a timing chart showing a current passing to the transformer arranged in the switching power source apparatus of the first embodiment.

When the switch Q1 is turned on, the primary winding 5a of the transformer T1 passes a current n1i to accumulate energy in an exciting inductance of the transformer T1. As shown in FIG. 12, the current n1i changes to take a current value a (negative value) at time t1, a current value b (negative value) at time t1b, a current value c (zero) at time t13, and a current value d (positive value) at time t2. On the B-H curve of FIG. 11, magnetic flux changes in order of Ba, Bb, Bc, and Bd. Ba to Bg of FIG. 11 correspond to a to g of FIG. 12.

At this time, a current is passed to the capacitor Cx in order of Vdc1, Lx, Dx1, Cx, Q1, and Vdc1. Due to a resonance between the auxiliary reactor Lx and the capacitor Cx, the capacitor Cx increases the voltage thereof up to the sum of a voltage Vdc1 of the DC power source and a voltage of the clamp capacitor C1.

Figure 9:
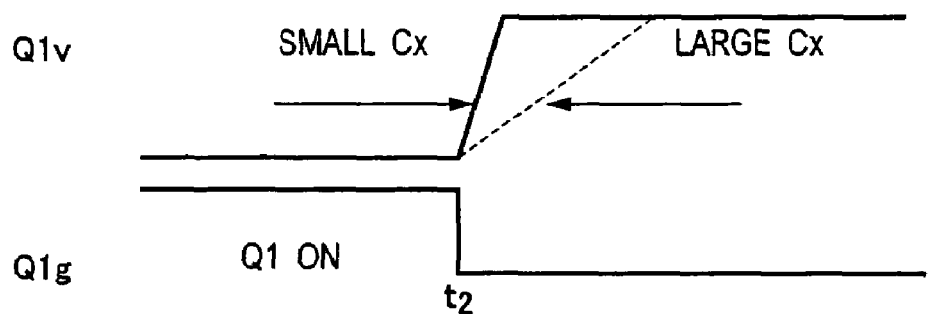
FIG. 9 is a view showing a changing state of rise time with respect to the capacitance of a snubber capacitor Cx in the switching power source apparatus of the first embodiment when the switch Q1 is turned off.

Next, at time t2 (t21 to t24), the switch Q1 is turned off. The energy accumulated in the exciting inductance of the transformer T1 discharges the capacitor Cx in order of 5a, Cx, Dx2, C1, and 5a, to thereby charge the clamp capacitor C1. At this time, the voltage Q1v of the switch Q1 gently rises due to the action of the capacitor Cx. A rise of voltage of the switch Q1 becomes gentler as the capacitance of the capacitor Cx becomes larger as shown in FIG. 9.

When the voltage of the capacitor Cx decreases to zero, the switch Q2 is turned on. Namely, the switch Q2 becomes a zero-voltage switch. From time t2 to t20, the current n1i changes from the current value d (positive value) to a current value e (zero). On the B-H curve of FIG. 11, magnetic flux changes from Bd to Be.

After the completion of discharge of the energy of the exciting inductance of the transformer T1, the clamp capacitor C1 discharges from time t20 to t3 in order of C1, Q2, 5a, and C1 to reset the magnetic flux of the transformer T1.

From time t20 to t3, the energy accumulated in the clamp capacitor C1 is fed back to the primary winding 5a of the transformer T, and therefore, the current n1i becomes a negative value as shown in FIG. 12. From time t20 to t2a, the current n1i changes from the current value e (zero) to a current value f (negative value). On the B-H curve of FIG. 11, magnetic flux changes from Be to Bf. An area S between time t2 and t20 is equal to an area S between time t20 to t2a. The area S corresponds to the energy of the transformer T1 accumulated in the clamp capacitor C1.

Next, from time t2a to t3, the current n1i changes from the current value f (negative value) to a current value g (negative value). On the B-H curve of FIG. 11, magnetic flux changes from Bf to Bg. An area E between time t2a and t3 corresponds to the energy of the capacitor Cx accumulated in the clamp capacitor C1.

Namely, the energy accumulated in the clamp capacitor C1 is the sum of the energy of the transformer T1 and the energy of the capacitor Cx. The current n1i is increased by the energy supplied from the capacitor Cx at the time of resetting. Accordingly, magnetic flux moves to the third quadrant to reach the saturation region (Bf-Bg), and the current n1i increases to the maximum at time t3 (also at time t1). The current n1i increases just before the end of the ON-period of the switch Q2. At this time, the transformer T1 saturates.

At time t3, the current Q2i of the switch Q2 also reaches a maximum. At this time, the switch Q2 is turned off, and the voltage Q1v of the switch Q1 rapidly decreases to zero. Then, the switch Q1 is turned on to realize ZVS of the switch Q1.

The current of the switch Q2 just before turning off the switch Q2 to realize ZVS of the switch Q1 is dependent on the capacitance of the capacitor connected in parallel with the switch Q1. As the capacitance becomes smaller, the current becomes smaller. Accordingly, the capacitance may be set to be small. If the capacitance is small, however, the inclination of a voltage produced when the switch Q1 is turned off increases, to increase the loss and noise of the switch. To avoid this, it is preferable that the parallel capacitance is small when the switch Q1 is turned on and is large when the switch Q1 is turned off. To realize this, according to the first embodiment, the capacitance is decreased when turning on the switch Q1 (parasitic capacitance between the drain and source of the switch Q1 will do) and the capacitor Cx is added in parallel through the diode Dx2 when the switch Q1 is turned off.

When the capacitance of the capacitor Cx is sufficiently increased as shown in FIG. 9, the inclination (dv/dt) of a voltage increase of the switch Q1 is relaxed when the switch Q1 is turned off. This results in reducing the noise and loss of the switch Q1.

Increasing the magnetic permeability μ of the core and enlarging the capacitance of the capacity Cx move the energy of the capacitor Cx to the clamp capacitor C1 and shift the magnetic flux of the transformer T1 to the third quadrant. This results in expanding the range of use of the transformer T1, increasing a current, and easily realizing ZVS of the switch Q1. The current becomes larger than that obtained in the saturation region of the core of the transformer T1, to easily realize the ZVS operation of the switch Q1.

SECOND EMBODIMENT

Figure 13:
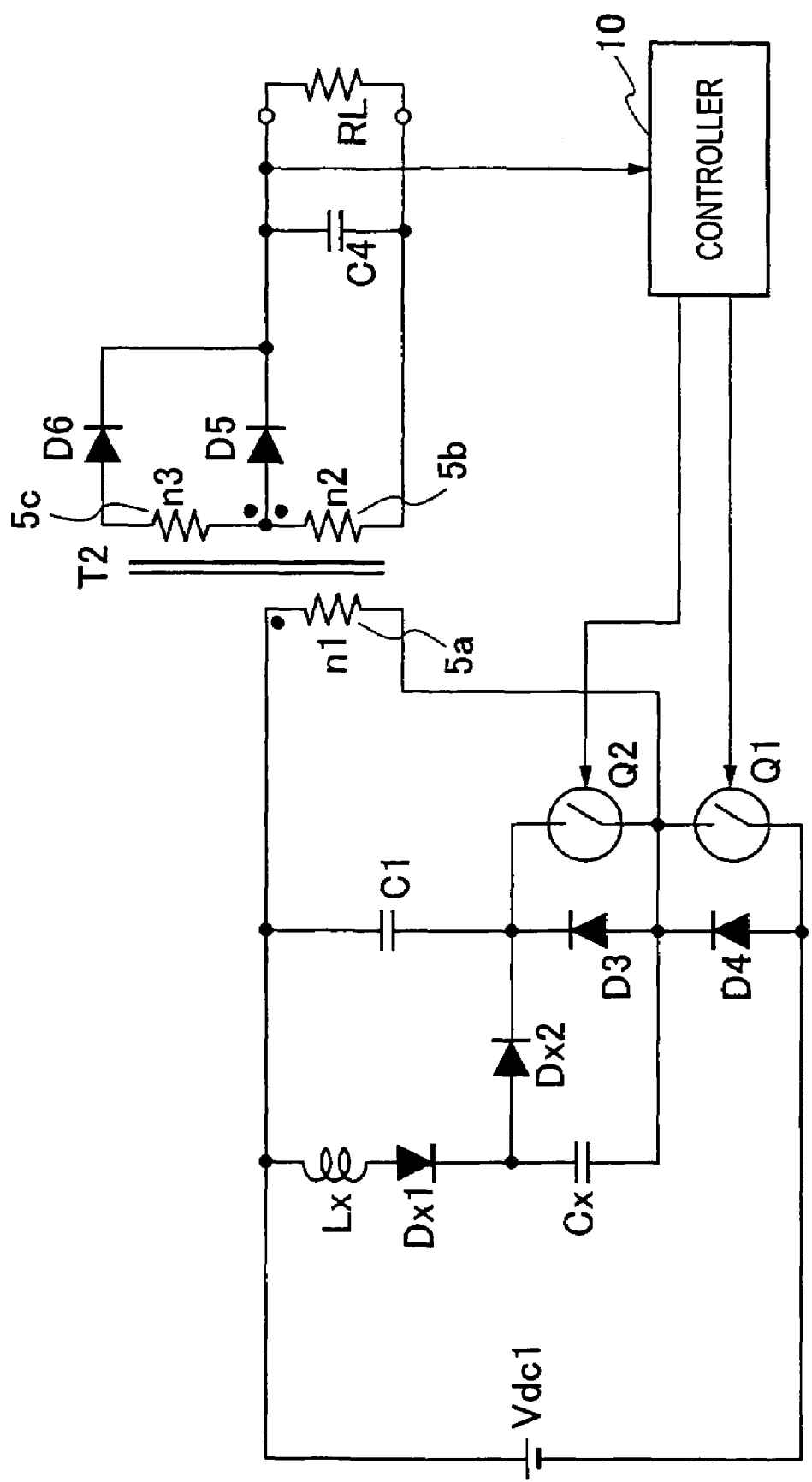
FIG. 13 is a circuit diagram showing a switching power source apparatus according to a second embodiment.

A switching power source apparatus according to the second embodiment of the present invention will be explained. FIG. 13 is a circuit diagram showing the switching power source apparatus according to the second embodiment. The switching power source apparatus of the second embodiment of FIG. 13 differs from the switching power source apparatus of the first embodiment of FIG. 5 in a circuit on the secondary side of a transformer T2, and therefore, only this part will be explained.

The transformer T2 has a primary winding 5a (the number of turns of n1), a secondary winding 5b (the number of turns of n2), and a tertiary winding 5c (the number of turns of n3).

Each end of a series circuit consisting of the secondary winding 5b and tertiary winding 5c of the transformer T2 is connected to a series circuit consisting of a diode D6 and a capacitor C4. A node between the secondary winding 5b and the tertiary winding 5c and a node between the diode D6 and the capacitor C4 are connected to a diode D5. The primary winding 5a and secondary winding 5b are wound in the same phase, and the primary winding 5a and tertiary winding 5c are wound in opposite phases.

The secondary winding 5b and primary winding 5a of the transformer T2 are loosely coupled, and a leakage inductance between the primary winding 5a and the secondary winding 5b is used as a reactor (not shown) connected in series with the transformer T2. The tertiary winding 5c and primary winding 5a of the transformer T2 are slightly loosely coupled.

Operation of the switching power source apparatus of the second embodiment with the above-mentioned configuration will be explained. A basic operation of the second embodiment is the same as that of the first embodiment, and therefore, operation of the circuit on the secondary side of the transformer T2 will be mainly explained.

When the switch Q1 is turned on, a current passes in order of Vdc1, 5a, Q1, and Vdc1. At this time, the secondary winding 5b of the transformer T2 generates a voltage to pass a current in order of 5b, D5, C4, and 5b. As a result, a current to the diode D5 linearly increases.

Next, the switch Q1 is turned off, and energy accumulated in the leakage inductance between the primary winding 5a and secondary winding 5b of the transformer T2 is returned through the transformer T2 to the secondary side. On the secondary side, a voltage is induced on the tertiary winding 5c of the transformer T2, to pass a current in order of 5c, D6, C4, 5b, and 5c. Namely, the diode D6 passes the current.

In this way, the value of the inductance connected in series with the primary winding 5a of the transformer T2 is increased to return energy accumulated when the switch Q1 is ON to the secondary side through the transformer T2, to thereby increase efficiency. Due to the diodes D5 and D6, a secondary current continuously passes during the ON and OFF periods of the switch Q1, to reduce a ripple current of the capacitor C4.

Figure 14:
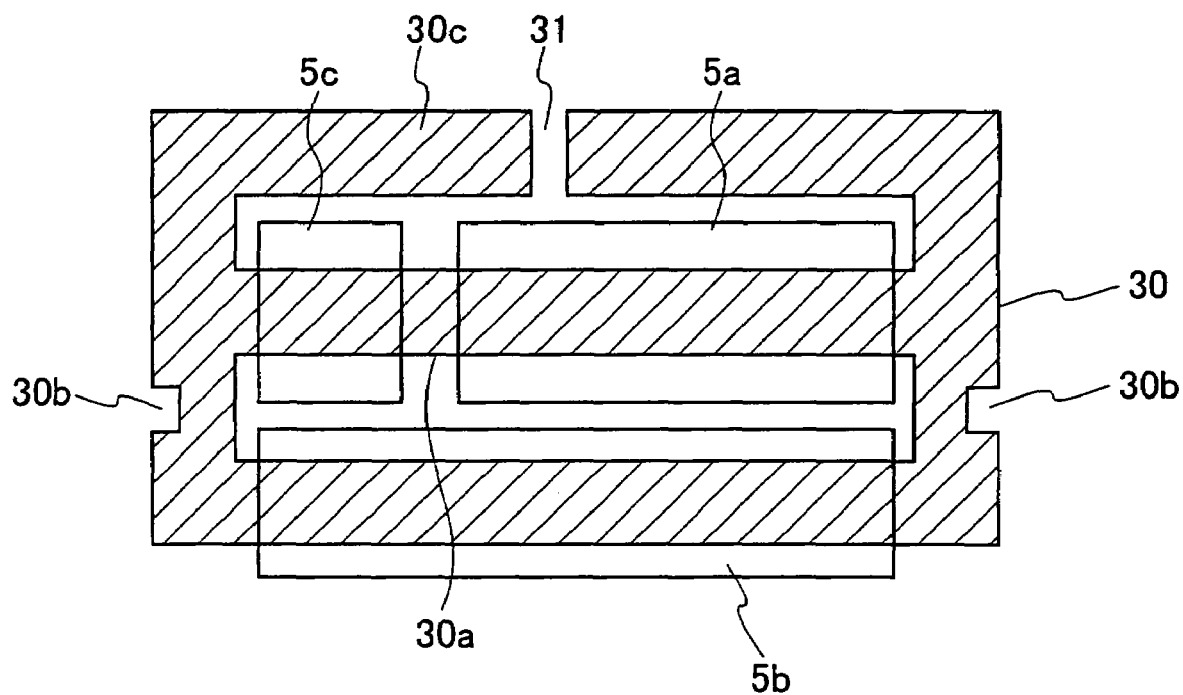
FIG. 14 is a schematic view showing a transformer arranged in the switching power source apparatus of the second embodiment.

FIG. 14 is a view showing the structure of the transformer installed in the switching power source apparatus of the second embodiment. The transformer T2 shown in FIG. 14 has a core 30 having an H-shape with closed top and bottom. A core part 30a of the core 30 is wound with the primary winding 5a and tertiary winding 5c those are close to each other to form a slight leakage inductance between them. The core 30 has a path core 30c and a gap 31. A peripheral core is wound with the secondary winding 5b. Namely, the path core 30c loosely couples the primary winding 5a with the secondary winding 5b, to increase the leakage inductance.

The core 30 of the transformer T2 is wound with the primary winding 5a and secondary winding 5b so as to form the leakage inductance, and the primary winding 5a and tertiary winding 5c are wound to form a leakage inductance that is smaller than that formed by the primary winding 5a and secondary winding 5b.

On the peripheral core between the primary winding 5a and the secondary winding 5b, there are formed two recesses 30b. The recesses 30b partly narrow the cross sectional area of a magnetic path of the peripheral core, so that only the narrowed parts saturate to reduce a core loss.

By devising the shape and windings of the core of the transformer T2 in such a way, this embodiment reduces the switching power source apparatus in size and cost.

THIRD EMBODIMENT

Figure 15:
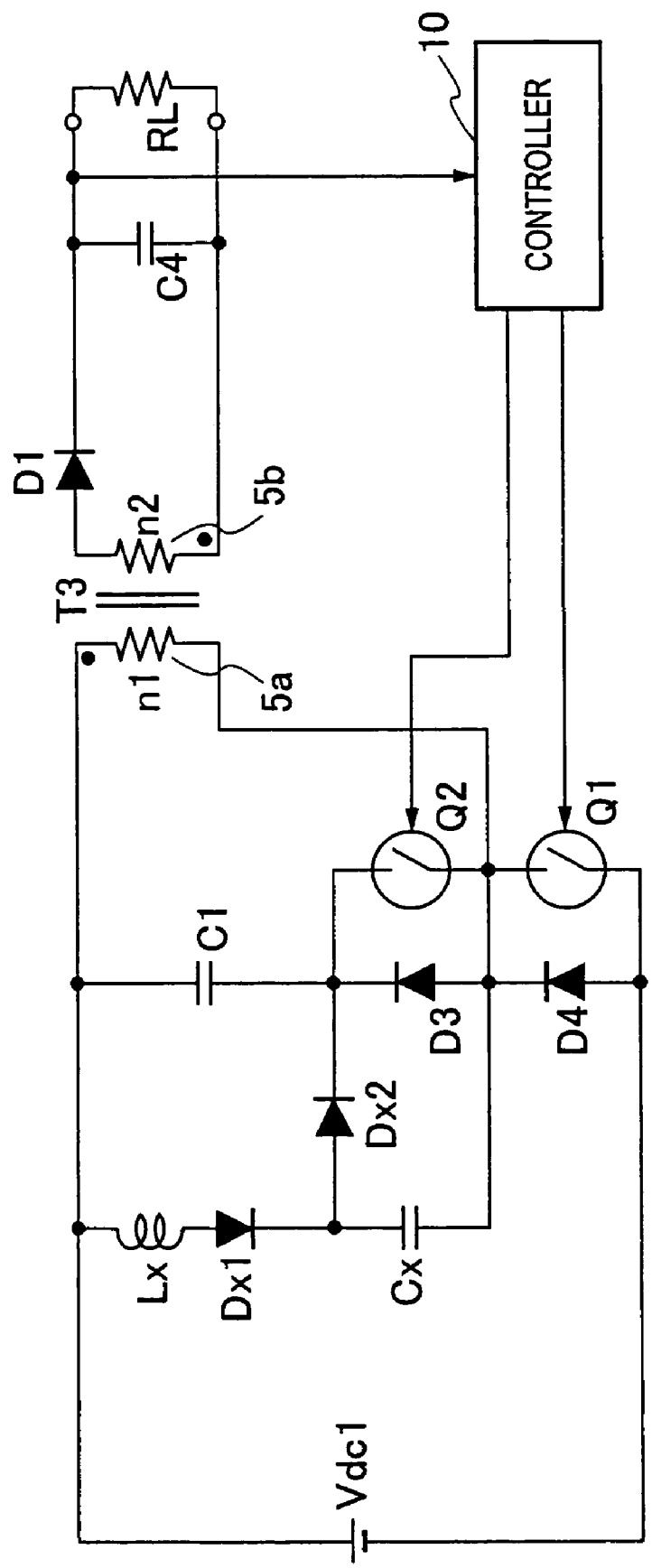
FIG. 15 is a circuit diagram showing a switching power source apparatus according to an third embodiment.

A switching power source apparatus according to the third embodiment of the present invention will be explained. FIG. 15 is a circuit diagram showing the switching power source apparatus according to the third embodiment. The switching power source apparatus of the third embodiment of FIG. 15 differs from the switching power source apparatus of the first embodiment of FIG. 5 in a circuit on the secondary side of a transformer T3, and therefore, only this part will be explained.

A core of the transformer T3 is wound with a primary winding 5a and a secondary winding 5b (the number of turns of n2) that is of an opposite phase relative to the phase of the primary winding 5a. A first end of the secondary winding 5b is connected to an anode of a diode D1. A cathode of the diode D1 and a second end of the secondary winding 5b are connected to a capacitor C4. The diode D1 and capacitor C4 form a rectifying-smoothing circuit. The capacitor C4 smoothes a rectified voltage of the diode D1 and provides a DC output to a load RL.

Figure 16:
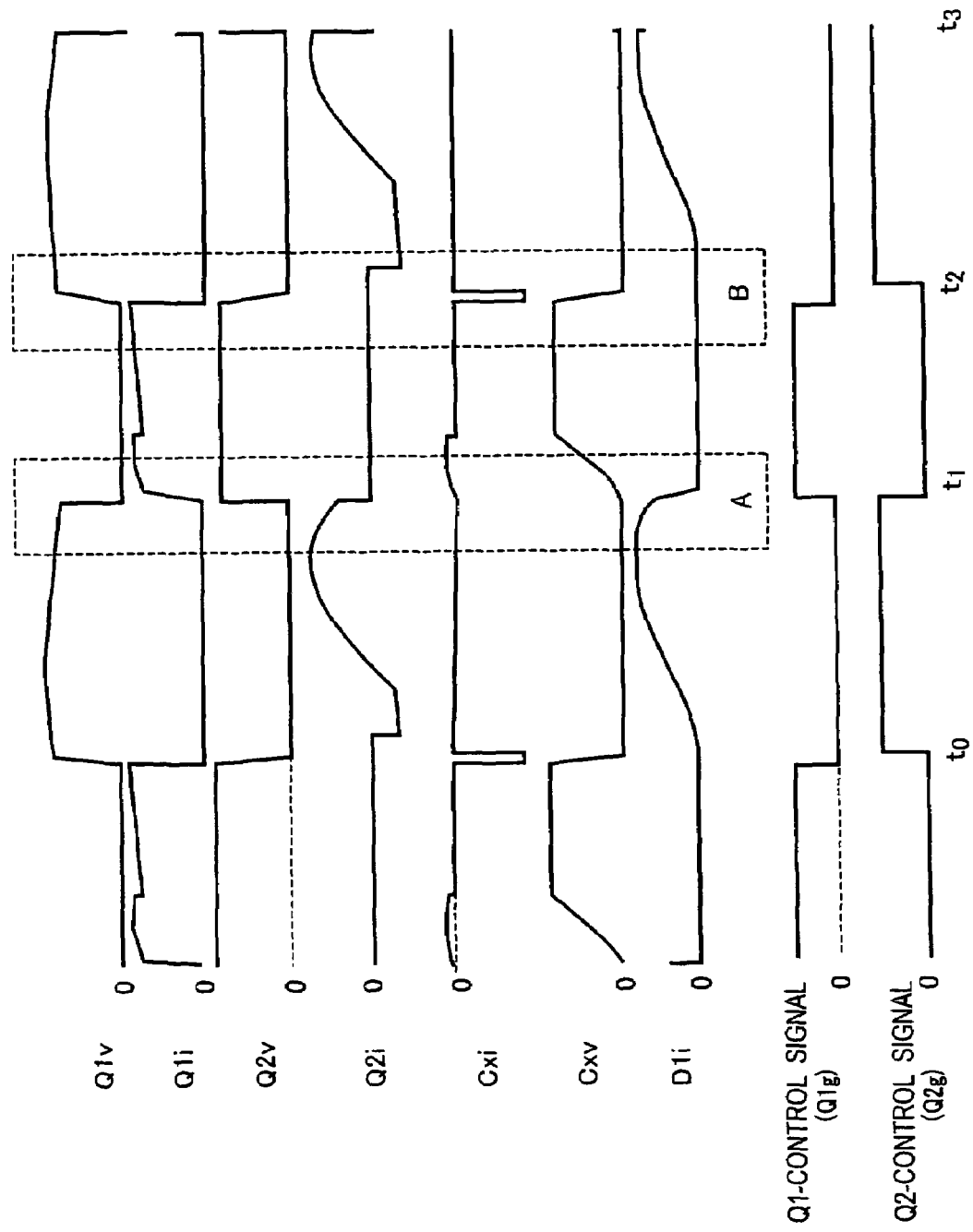
FIG. 16 is a timing chart showing signals at several parts of the switching power source apparatus of the third embodiment.
Figure 17:
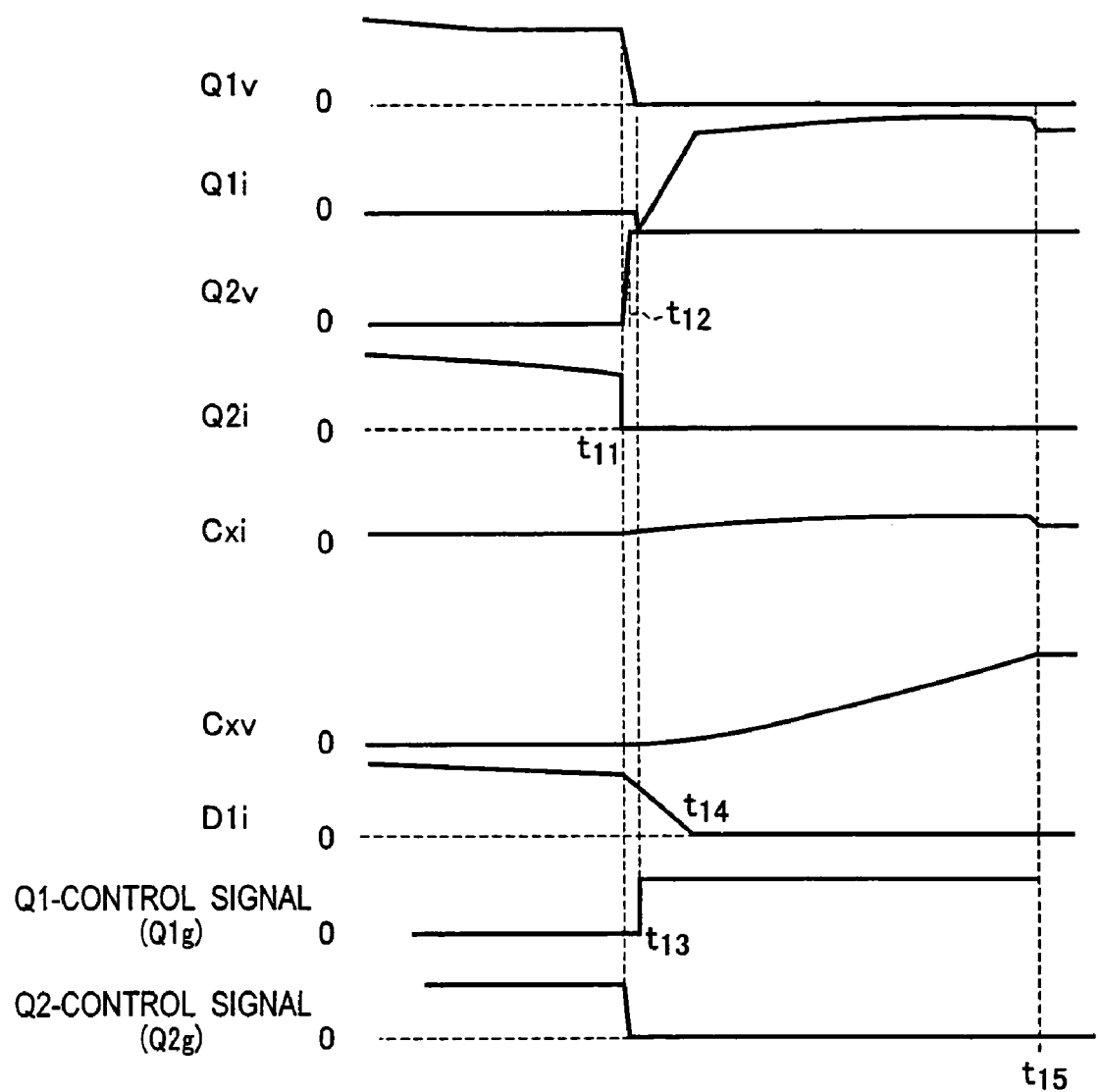
Figure 18:
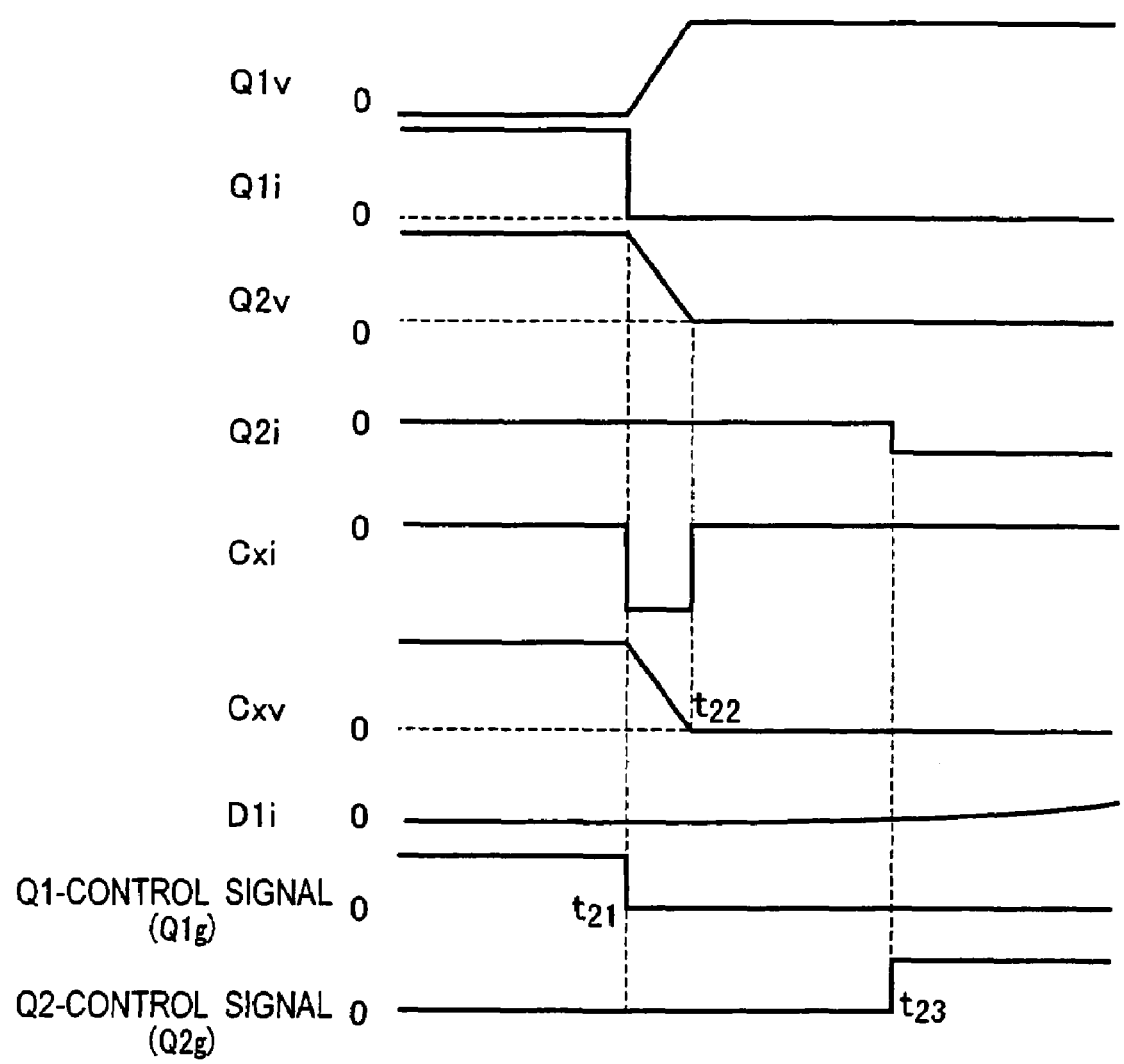
FIG. 18 is a timing chart showing the details of the signals at the several parts of the switching power source apparatus of the third embodiment when the switch Q1 is turned off.

Operation of the switching power source apparatus of the third embodiment with the above-mentioned configuration will be explained with reference to timing charts of FIGS. 16 to 18. FIG. 16 is a timing chart showing signals at several parts of the switching power source apparatus of the third embodiment. FIG. 17 is a timing chart showing the details of the signals at the several parts of the switching power source apparatus of the third embodiment when a switch Q1 is turned on. FIG. 18 is a timing chart showing the details of the signals at the several parts of the switching power source apparatus of the third embodiment when the switch Q1 is turned off.

In FIGS. 16 to 18, there are shown a terminal voltage Q1v of the switch Q1, a current Q1i passing to the switch Q1, a terminal voltage Q2v of a switch Q2, a current Q2i passing to the switch Q2, a current Cxi passing to a capacitor Cx, a terminal voltage Cxv of the capacitor Cx, and a current D1i passing to the diode D1.

The timing charts of FIGS. 16 to 18 are substantially the same as those of FIGS. 6 to 8. Only difference between them is operation of the circuit on the secondary side of the transformer T3, and therefore, operation of only the secondary side will be explained.

At time t1 (corresponding to time t11 to t12), the switch Q1 is turned on to pass a current in order of Vdc1, 5a, Q1, and Vdc1. At this time, no current passes to the diode D1.

At time t2 (t21 to t24), the switch Q1 is turned off, so that the capacitor Cx relaxes the inclination of a voltage increase in the OFF state of the switch Q1. Energy accumulated in the capacitor Cx is stored through a diode Dx2 in a clamp capacitor C1. This energy is supplied to the secondary winding 5b of the transformer T3 when the switch Q2 is turned on to pass the current D1i to the diode D1 and supply power to a load RL.

In this way, the switching power source apparatus of the third embodiment provides an effect similar to that provided by the switching power source apparatus of the first embodiment.

INDUSTRIAL APPLICABILITY

The switching power source apparatuses according to the present invention are applicable to DC-DC converting type power source circuits and AC-DC converting type power source circuits.

The invention claimed is:

1. A switching power source apparatus comprising:
   a first series circuit connected to each end of a DC power source and having a primary winding of a transformer and a main switch that are connected in series;
   a rectifying-smoothing circuit to rectify and smooth a voltage that is outputted from a secondary winding of the transformer when the main switch is turned on;
   a second series circuit connected to each end of the main switch or to each end of the primary winding of the transformer and having an auxiliary switch and a clamp capacitor those are connected in series;
   a third series circuit connected to each end of the primary winding of the transformer and having an auxiliary reactor, a first diode, and a snubber capacitor those are connected in series;
   a fourth series circuit connected to each end of the auxiliary switch and having a second diode and the snubber capacitor those are connected in series; and
   a control circuit to alternately turn on/off the main switch and auxiliary switch,
   the snubber capacitor being charged when the main switch is turned on, and the snubber capacitor being discharged to the clamp capacitor when the main switch is turned off, to relax the inclination of a voltage increase of the main switch.

2. The switching power source apparatus of claim 1, wherein the control circuit turns on the auxiliary switch to saturate a core of the transformer and increase an exciting current, and then, turns off the auxiliary switch to make the main switch conduct zero-voltage switching.

3. The switching power source apparatus of claim 1, wherein the rectifying-smoothing circuit has a fifth series circuit having the secondary winding and a tertiary winding of the transformer, a sixth series circuit connected to each end of the fifth series circuit and having a first rectifying diode and a smoothing capacitor, and a second rectifying diode connected to a node between the secondary winding and the tertiary winding and a node between the first rectifying diode and the smoothing capacitor.

4. The switching power source apparatus of claim 3, wherein the primary and secondary windings of the transformer are wound around the core of the transformer so as to provide a leakage inductance, and the primary and tertiary windings of the transformer are wound so as to provide a leakage inductance that is smaller than the leakage inductance provided by the primary and secondary windings.

5. The switching power source apparatus of claim 4, wherein a magnetic path of the core of the transformer has a portion with reduced cross-sectional area.

6. The switching power source apparatus of claim 2, wherein the rectifying-smoothing circuit has a fifth series circuit having the secondary winding and a tertiary winding of the transformer, a sixth series circuit connected to each end of the fifth series circuit and having a first rectifying diode and a smoothing capacitor, and a second rectifying diode connected to a node between the secondary winding and the tertiary winding and a node between the first rectifying diode and the smoothing capacitor.

7. The switching power source apparatus of claim 6, wherein the primary and secondary windings of the transformer are wound around the core of the transformer so as to provide a leakage inductance, and the primary and tertiary windings of the transformer are wound so as to provide a leakage inductance that is smaller than the leakage inductance provided by the primary and secondary windings.

8. The switching power source apparatus of claim 7, wherein a magnetic path of the core of the transformer has a portion with reduced cross-sectional area.

9. A switching power source apparatus comprising:
a first series circuit connected to each end of a DC power source and having a primary winding of a transformer and a main switch those are connected in series;
a rectifying-smoothing circuit to rectify and smooth a voltage that is outputted from a secondary winding of the transformer when the main switch is turned off;
a second series circuit connected to each end of the main switch or to each end of the primary winding of the transformer and having an auxiliary switch and a clamp capacitor those are connected in series;
a third series circuit connected to each end of the primary winding of the transformer and having an auxiliary reactor, a first diode, and a snubber capacitor those are connected in series;
a fourth series circuit connected to each end of the auxiliary switch and having a second diode and the snubber capacitor those are connected in series; and
a control circuit to alternately turn on/off the main switch and auxiliary switch,
the snubber capacitor being charged when the main switch is turned on, the clamp capacitor being discharged through the secondary winding to the rectifying-smoothing circuit when the auxiliary switch is turned on, and the snubber capacitor being discharged to the clamp capacitor when the main switch is turned off, to relax the inclination of a voltage increase of the main switch.

10. The switching power source apparatus of claim 9, wherein the rectifying-smoothing circuit has a series circuit being connected to each end of the secondary winding of the transformer and having a rectifying diode and a smoothing capacitor.

* * * * *